(12) United States Patent
Kasper (10) Patent No.: US 8,737,170 B2
(45) Date of Patent: May 27, 2014

(54) ULTRASONIC GRASSHOPPER AND PEST DETERRENT

(76) Inventor: LaDean Ray Kasper, Monument, CO (US)

( * ) Notice: Subject to any disclaimer, the term of this patent is extended or adjusted under 35 U.S.C. 154(b) by 0 days.

(21) Appl. No.: 13/547,618

(22) Filed: Jul. 12, 2012

(65) Prior Publication Data
US 2013/0077446 A1   Mar. 28, 2013

Related U.S. Application Data

(60) Provisional application No. 61/539,264, filed on Sep. 26, 2011.

(51) Int. Cl.
*A01M 29/18* (2011.01)

(52) U.S. Cl.
USPC .......................................................... 367/139

(58) Field of Classification Search
USPC .......................................................... 367/139
See application file for complete search history.

(56) References Cited

U.S. PATENT DOCUMENTS

| | | | |
|---|---|---|---|
| 3,838,418 A | 9/1974 | Brown | |
| 4,562,561 A | 12/1985 | Ackley | |
| 4,689,776 A * | 8/1987 | Thorndyke et al. | 367/139 |
| 4,999,818 A * | 3/1991 | Malleolo | 367/139 |
| 6,104,283 A * | 8/2000 | Otomo | 367/139 |
| 6,166,996 A | 12/2000 | Grissom | |
| 6,570,494 B1 * | 5/2003 | Leftridge, Sr. | 367/139 |
| 6,856,243 B2 | 2/2005 | Smith | |
| 7,324,408 B2 | 1/2008 | Cilliers | |
| 2003/0058740 A1 * | 3/2003 | Jincks | 367/139 |
| 2006/0233049 A1 * | 10/2006 | Cilliers | 367/139 |
| 2012/0235625 A1 * | 9/2012 | Takehara | 320/136 |
| 2013/0077446 A1 * | 3/2013 | Kasper | 367/139 |

* cited by examiner

*Primary Examiner* — Daniel Pihulic
(74) *Attorney, Agent, or Firm* — Daniel Boudwin; Global Intellectual Property Agency LLC (57) ABSTRACT

Disclosed is an ultrasonic pest deterrent device adapted for use in greenhouses and gardens, comprising a printed circuit board, output signal transducer and a housing adapted to shroud the components of the assembly within its waterproof interior. The device comprises a ramp signal generator and voltage control oscillator adapted to sweep between a chosen set of switchable frequency pitch ranges and tones, a sweep stop for single tone testing, a confidence test button, a power switch and indicator light. The confident test button provides an audible tone within human hearing range to ensure the device is operational, while the power indicator light provides a visual means of verifying operation when the device is emitting signals in the ultrasonic range. A timing circuit disables or modulates the device from continuous operation, saving battery life and randomizing the output signal for increased pest annoyance and deterrence.

15 Claims, 4 Drawing Sheets

ULTRASONIC GRASSHOPPER AND PEST DETERRENT

CROSS REFERENCE TO RELATED APPLICATION

This application claims the benefit of U.S. Provisional Application No. 61/539,264 filed on Sep. 26, 2011, entitled "Sonic Grasshopper and Pest Deterrent." The patent application identified above is incorporated here by reference in its entirety to provide continuity of disclosure.

BACKGROUND OF THE INVENTION

1. Field of the Invention

The present invention relates to pest deterrents and high frequency sonic generators. More specifically, the present invention relates to an electrical device for emitting an ultrasonic sound to drive away pests from a given area, preventing them from infesting or consuming crops and vegetation.

Grasshoppers and other insects can devastate a greenhouse or garden in a short amount of time by consuming its edible vegetation, stunting growth of the plants or killing them entirely. Insects of this type can infest and devour large volumes of plant life, wherein their removal is difficult and time consuming. Similar to insect pests, larger herbivores such as voles and birds can pose a threat to an individual's plant vegetation by consuming large quantities thereof. To remedy this common problem, homeowners and farmers generally utilize toxic insecticides or traps to kill and keep pests away. However, these insecticides tend to include harsh chemicals that may be potentially harmful to household animals or damage the food or plants themselves. Besides being dangerous, pesticides can also be expensive and traps can prove ineffective with respect to larger infestations of ground rodents and vermin. A more effective solution to this problem is therefore required, wherein the solution does not pose harm to the plants themselves and is more broadly effective.

It is well understood that certain insects and animals have the ability to perceive ultrasonic sounds beyond the range of human hearing, whereby these animals are capable of receiving or transmitting sound waves in excess of 20 kHz. It is further submitted that certain signals within the ultrasonic spectrum, being of particular pitch, tone and intensity, can be particularly annoying or even painful for certain species of animals. Evidence of this is seen in the application of dog whistles, wherein an ultrasonic whistle transmits sound waves above human hearing levels to communicate or inflict pain on the dog for training, attention grabbing or obedience purposes. In a similar fashion, ultrasonic sound generators have been produced that emit sound waves in the ultrasonic range for deterring certain animals and pests from a given area. These devices include a number of differing structures and components for the purposes of creating an ultrasonic sound; however most lack the ability to sweep through a chosen set of frequency bands to ward off particular pests, while also not affecting animals such as household dogs and cats in the process.

The present invention is submitted as a means to deter pests using an ultrasonic sound emitter having a switchable set of frequency bands, a means to sweep across a broad or narrow set of frequencies, and a means of ensuring continued operation of the device through visual and auditory means. The device of the invention comprises a water resistant housing having a speaker transducer, wherein ultrasonic sound waves are generated as a passive means of dispersing pests and deterring their willingness to infest a given area. This allows homeowners to safely keep grasshoppers, voles and other pests away from their greenhouses, gardens and fields, wherein a frequency band found most suitable for given pest is chosen for operation. The device may be mounted on the inside of a greenhouse, receive outlet or battery power and will automatically turn itself on and off over certain intervals. This eliminates the need for insecticide poisons or traps, uses very little power and can be used year-round with little maintenance.

2. Description of the Prior Art

Devices have been disclosed in the prior art that relate to pest deterrent and ultrasonic signal generating devices. These include devices that have been patented and published in patent application publications. The forgoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 4,562,561 to Ackley is one such device that discloses an electrical apparatus for repelling animal and insect pests using an ultrasonic signal that is pulsed or swept across a frequency range, wherein the ultrasonic receptors of the pests are disrupted and the pests are driven away from the signal source. A first, second and third signal are disclosed, along with a means for modulating the selected signal. The first signal includes a fundamental frequency of 22 kHz, the second signal having a pair of fundamental frequencies of approximately 22 and 35 kHz, and the third signal having a plurality of fundamental frequencies in the range of 18 kHz to 33 kHz. A means of sweeping through the fundamental frequencies is built into the circuit, while an ultrasonic transducer outputs the signal from the circuit. The Ackley device, while disclosing a signal generator as a means of deterring pests, fails to disclose many of the key features inherent in the present invention, including the construction of the overall assembly, along with the options provided by the present circuit board design that allow four separate tone frequencies and a means of establishing a consistent narrow or broad range frequency sweep during operation. The ability to test the operation of the device using a frequency within human hearing range is further not disclosed by Ackley.

U.S. Pat. No. 3,838,418 to Brown is another such device, where a pest control apparatus is disclosed having a tone generator create an output frequency as a function of applied voltage, along with a transducer for outputting the signal. The tone generator includes a means of providing an interrupted, slop saw-tooth output having a continuously changing frequency between intervals of constant tone frequency. A gating means for chopping the output tone into changing frequency periods interspersed with output rest periods. The Brown device is adapted for dispersing mice and rats using an ultrasonic sound wave that modulates frequency with a secondary modulation of pitch. Periodic bursts of high intensity ultrasonic sound are intervened by rest periods, which prolongs the life of the transducer when compared with continuous operation, while remaining effective for its intended purpose. While similarly using an ultrasonic noise source to cause pests to flee, the Brown device provides a means of modulating pitch for increasing the coefficient of annoyance. Its design elements and intent differ from that of the present invention.

Further, U.S. Pat. No. 4,999,818 to Malleolo discloses a circuit for producing ultrasonic signals for repelling pests and vermin. The device comprises a transducer for producing ultrasonic signals, an audio amplifier, and an oscillator having at least a first and second multivibrator means. The oscillator includes a variable resistance network for adjusting the frequency thereof using an operable switch to choose a particular frequency. The transducer is preferably an acoustic speaker with a frequency range between 22 kHz and 50 kHz. The Malleolo device offers a variable resistance network as a means of choosing the output signal. Similar to the Brown and Ackley, the design elements and operation of Malleolo differ from that of the present invention.

U.S. Pat. No. 7,324,408 to Cilliers discloses another pest repelling device installed within a vehicle, wherein the device is adapted to deter rodents and insects from entering and nesting within the engine compartment of a motor vehicle. The device comprises a control unit and a plurality of transducers adapted to connect to the control unit to provide a random sweep between 1 millisecond and 1 second bursts between a lower frequency of 20 kHz and an upper frequency of 45 kHz. The Cilliers device is one that is adapted to be utilized in conjunction with a motor vehicle and be housed within the engine bay compartment, which can be prone to bird and rodent nests over time, and in particular if the vehicle is left parked outdoors for extended periods. The construction and intent of the Cilliers device diverges from that of the present invention, which is designed for greenhouses and outdoor use, and includes a different circuit design and application of ultrasonic sound for pest deterrence.

Finally, U.S. Pat. No. 6,166,996 to Grissom discloses an ultrasonic broadband frequency transducer for pest repulsion, wherein the device comprises a variable frequency generator, at least one ultrasonic frequency amplifier, and a transponder unit comprising at least two transducers. The device is adapted to address the directional and attenuation problems with existing pest repulsion transducers, wherein most existing devices utilize a single frequency transducer that is centered about a center frequency and whose response curve sharply drops off moving away from this frequency. The Grissom device contemplates utilizing several transducers or speakers for a more effective device having a broader effective frequency response curve. The present invention provides a single transducer, however the elements and functions of the present invention differ significantly in design elements and in intent from the Grissom device.

The present invention is designed to utilized sound technology to rid greenhouses and gardens of unwanted pests. The device emits a sweeping high frequency sound wave, above the human hearing range, that is painful or annoying for insects and rodents to bear at close range. The invention includes four main components: a housing unit, a circuit card assembly, a signal transducer and a power supply module. The circuit design creates sweep frequencies applied to a driver section that drives the transducer, which is preferably a piezo power speaker. The circuit allows a narrow or broadband sweep is provided, along with a confidence tester signal generator for emitting sound in the human hearing range. It is submitted that the present invention is substantially divergent in design elements from the prior art, and consequently it is clear that there is a need in the art for an improvement to existing ultrasonic pest deterrent devices. In this regard the present invention substantially fulfills these needs.

SUMMARY OF THE INVENTION

In view of the foregoing disadvantages inherent in the known types of ultrasonic pest deterrent devices now present in the prior art, the present invention provides a new pest deterrent and ultrasonic signal generator, wherein the same can be utilized for providing convenience for the user when deterring insects and other pests from a given area, and in particular greenhouses and garden areas.

It is therefore an object of the present invention to provide a new and improved ultrasonic pest deterrent device that has all of the advantages of the prior art and none of the disadvantages.

It is another object of the present invention to provide an ultrasonic pest deterrent device that comprises a waterproof housing, a sound wave generating transducer, an internal Printed Circuit Board (PCB) and user input controls for deterring insects and rodents from a given area using a passive annoyance or pain-inducing signal.

Another object of the present invention is to provide an ultrasonic pest deterrent device that includes a signal ramp generator, a timer generator, a voltage controlled oscillator and a user switch control for ramping a signal across a chosen frequency band, wherein the frequency sweep range and tone of the signal is chosen by the user.

Yet another object of the present invention is to provide an ultrasonic pest deterrent device that includes a timer generator to disable the outgoing signal and prevent continuous operation, thus preserving battery life or reducing power consumption.

Another object of the present invention is to provide an ultrasonic pest deterrent device that includes a visual means of ensured operation, along with a confidence switch that momentarily shifts the frequency of the signal within human range to audibly ensure device operation.

A final object of the present invention is to provide an ultrasonic pest deterrent device that does not interfere or conflict with the hearing of household pets, and further provides a passive means of pest deterrence without the use of traps or chemical pesticides.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the pest deterrent device. For the purposes of presenting a brief and clear description of the present invention, the preferred embodiment will be discussed as used for dispersing and deterring greenhouse and garden pests from a given area using an ultrasonic sound signal. The figures are intended for representative purposes only and should not be considered to be limiting in any respect.

Figure 1:
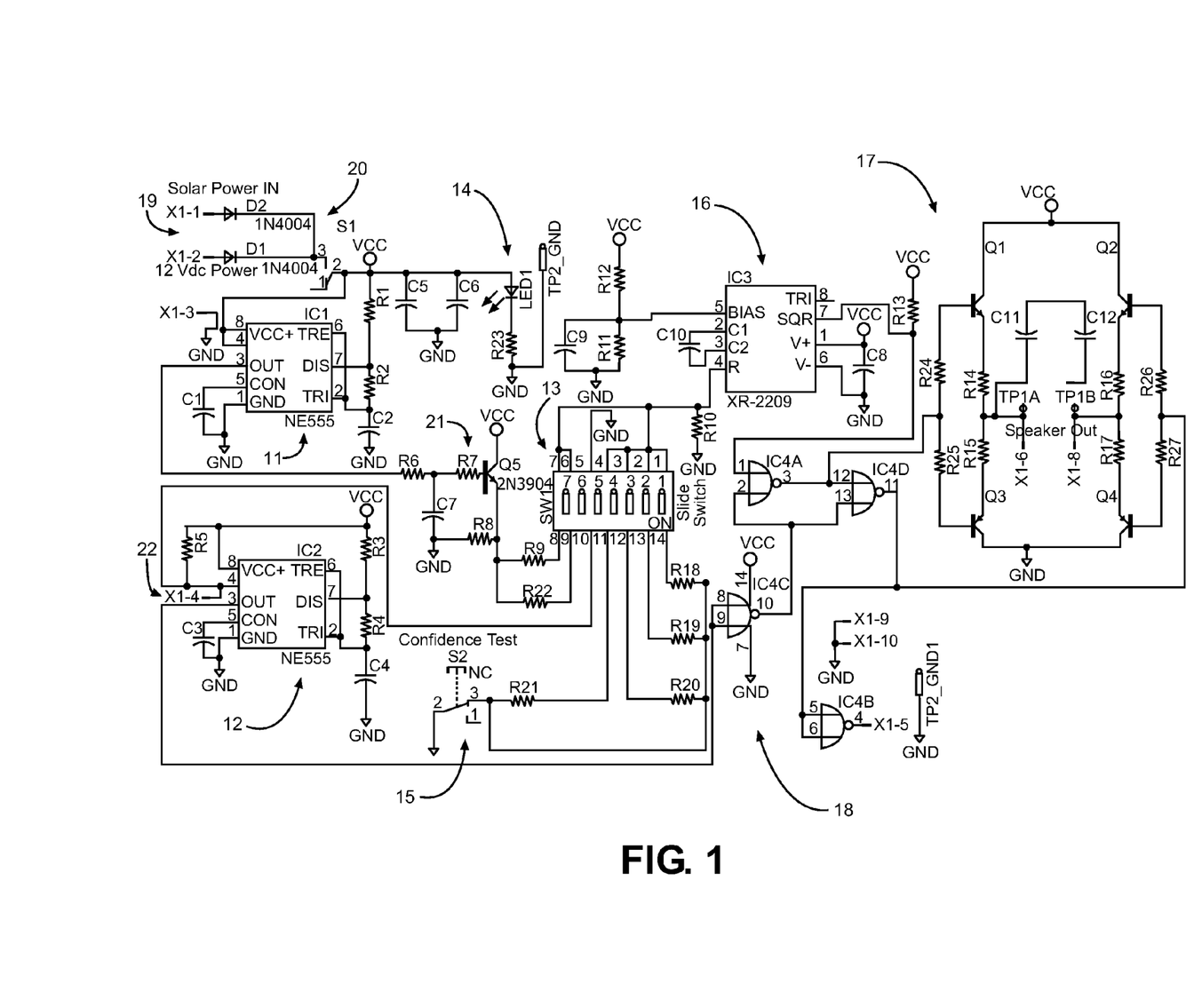
FIG. 1 shows a schematic of the printed circuit board within the device housing, which generates the signal and controls the device operation.

Referring now to FIG. 1, there is shown a schematic diagram of the circuit board controller of the present invention, wherein the circuit controls the functionality and operation of the device and accepts user input. The primary components of the circuit board include a power source input 19, which is preferably a 12 VDC wall module power supply rated at 500 mA, a power switch 20, a Light Emitting Diode (LED) indicator 14, a confidence test button 15, signal ramp generator 11, a voltage control oscillator (VCO) 16, a signal transducer 17, and a timer generator 12. Further provided is an output for an external amplifier, a switch 13 for controlling the desired frequency bands, and an optional external disable/enable controller logic circuit. The elements of the circuit board provide a means to generate a ramping or constant ultrasonic sound signal whose primary function is to disperse or deter pests from a given area. In particular, grasshopper insects and vole rodents are targeted within greenhouses and gardens, wherein these animals can otherwise be devastating to crops and the provided frequency bands of the present invention have been shown to be particularly effective for preventing infestation. The circuit design provides a means of outputting either a single tone output or a sweep within a defined band of frequencies, while further accepting input from the user via the selection or cycling through the different frequency tones or bands depending on what particular pest is targeted and the bands/tones shown most effective therefor. Further provided is a means of testing the operation of the device by requesting an output frequency within human hearing ranges.

The circuit is designed to function with a power source input 19 between 9 to 14 VDC, wherein it is preferred that this power be supplied by a wall module power or a battery pack for independent operation. The power source is preferably 12 VDC and rated for 500 mA. This 12 VDC source is connected to connector X1-2 (+12 VDC input) and X1-3 (Ground), while diode D1 protects the circuit from voltage reversal. Using a nominal supply of 12 VDC, the circuit draws less than 250 mA when driving a 4 Watt piezoelectric speaker/sound transducer 17 during operation. Further contemplated in the circuit design is photovoltaic solar cell power input through connector X1-1, wherein the solar cell creates electrical power from solar energy for prolonged outdoor use and can further be utilized to supplement battery power draw. Solar power input assumes the solar input is a solar device (photovoltaic panel) connected to a 12 volt battery that if connected in conjunction with a wall mount power supply, the solar cell will supply power whenever its voltage is greater than the wall mount. The Light Emitting Diode (LED1) 14 is illuminated to confirm the circuit is powered when the power switch (S1) 20 is turned on to accept current from the power source.

Figure 2:
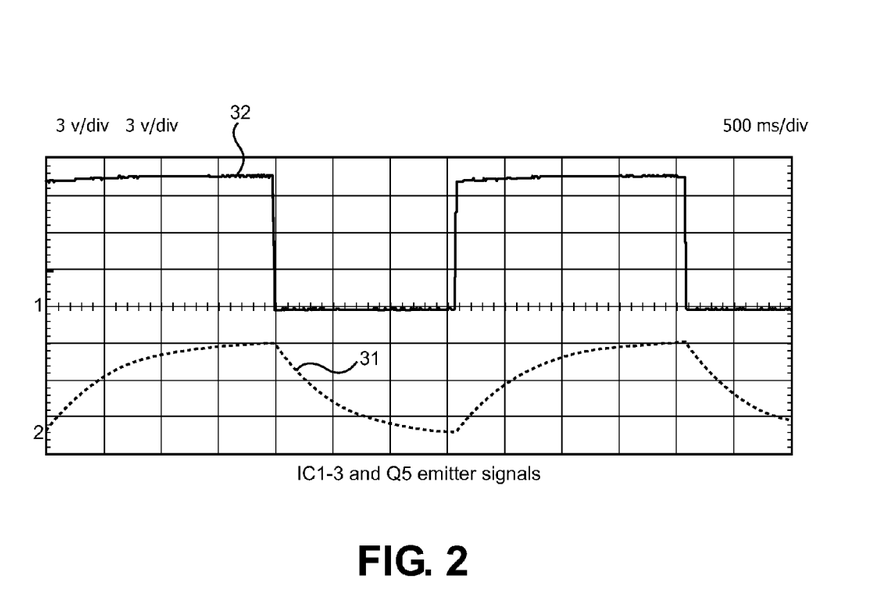
FIG. 2 shows the output signal from the ramp generator and emitter follower Q5.

A ramp generator 11 comprises a 555 timer integrate circuit (IC1) configured as a square wave oscillator with a frequency of approximately 0.25 Hz. The high output pulse (T1) is set at approximately 2.2 seconds and the low pulse (T2) is set at approximately 1.8 seconds. These pulses are connected to a simple RC filter, R6 and C7, to create a crude triangular signal, or ramp signal as measured from the common-emitter amplifier (Q5) 21. As shown in FIG. 2, the square wave 32 from the 555 timer (IC1) and the triangular ramp signal 31 are shown, as measured from IC1-3 (555 output) and the common-emitter amplifier (Q5) 21. The ramp generator 11 creates a signal that sweeps the outgoing signal through a desired frequency band, increasing the coefficient of annoyance and the painful nature of the ultrasonic signal to drive pests away from a given area.

Figure 3:
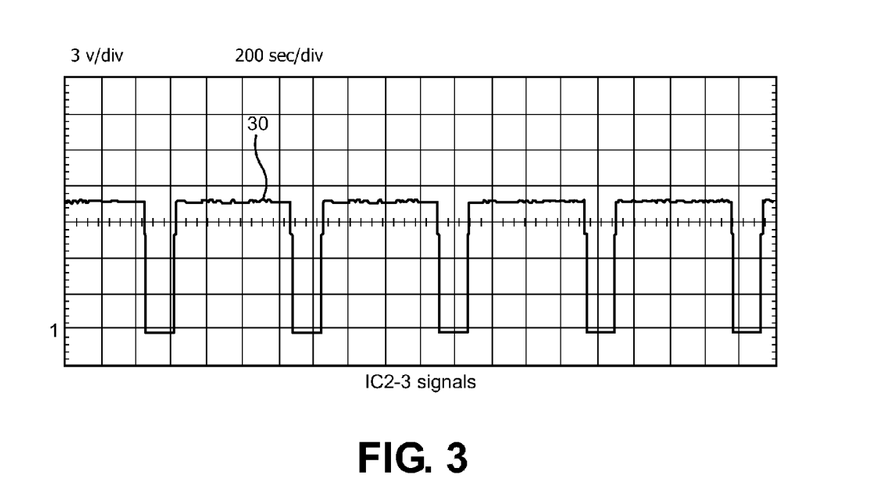
FIG. 3 shows the output signal from the timer generator after reset.

The disclosed timer generator 12 utilizes a second 555 timer integrated circuit (IC2), and is designed to enable operation of the device for approximately 600 seconds (10 minutes) and then disable it for approximately 120 seconds (approx 2 minutes). It than repeats the cycle. This provides a means to switch the outgoing signal on and off for reduced power consumption purposes and to further increase the coefficient of annoyance for the targeted pests, wherein the signal is intermittent and difficult to ignore when switched on and off. Referring now to FIG. 3, there is shown the output of the timer generator 12 via integrated circuit IC2-3 after the signal is reset, wherein the signal lasts for approximately 600 seconds, disables for 120 seconds and then restarts for another 600 seconds.

The switch 13, designated SW1, provides a means for the user to choose an output tone frequency and sweep band for the outgoing signal. The switches control a set of tones and frequency ranges in which the frequency of the outgoing signal is ramped, which allows the user to choose a given band that is particularly suited for a target pest. The ramp generator 11 drives the voltage control oscillator (VCO) 16, which comprises an XR-2209 VCO integrated circuit (IC3). Capacitor C10 is the VCO timing capacitor, while resistor R10 and any resistance switched across it with the SW1 switch 13 limits the current and sets the VCO frequency. The higher the total resistance, the lower the VCO output frequency. With all SW1 switches 13 open, the tone is designed to be approximately 1.4 KHz. The VCO output frequency is inversely proportional to the value of capacitor C10 and directly proportional to the current from VCO 103-4. With the SW1 switches #1 through #7 all open (no ramp signal or other switched resistors), the VCO frequency output, in Hz, equates to: Freq=1/(R10×C10). When SW1 switch #7 is closed it connects the ramp output to IC3 pin #4. This ramp signal, applied through resistor R9 causes the VCO output to sweep in frequency. The value of resistor R9 determines how wide the frequency band is. The lower the value of resistor R9, the wider the frequency band becomes. The frequency band is approximately 10 KHz. In the same way, if SW1 switch #6 (switch #7 open) is on then resistor R22 creates a narrower frequency band.

The following chart illustrates the output tones and frequency bands available by the switch 13:

TABLE 1

SW1 Switchable Frequencies and Tones

| SW1 Switches | Tone Freq | Wide Range*<br>Narrow Range* |
|---|---|---|
| SW1-1, 2, 3, 4, 5 all off | 1.4 KHz (1.51K*) | 0-10 KHz<br>1.25K-2.5 KHz |
| SW1-1 | 15 KHz (14.12K*) | 11K-24 KHz<br>14K-15.4 KHz |
| SW1-2 | 20 KHz (20.3K*) | 18K-30 KHz<br>20K-22 KHz |
| SW1-3 | 25 KHz (23.9K*) | 22K-34 KHz<br>24.4K-25.6 KHz |
| SW1-4 | 35 KHz (34.6K*) | 33K-45 KHz<br>35.7K-37 KHz |
| SW1-5 | Disables VCO output | |
| SW1-6 | Connects ramp to VCO, Narrow RANGE | Enables Narrow |
| SW1-7 | Connects ramp to VCO, WIDE RANGE | Enables Wide |

In this way, the switch provides a means to switch the outgoing between a signal within human range (1 K to 10 KHz) to an ultrasonic pest deterrent range (18K to 25 KHz), which has been shown to be particularly effective for grasshopper insects and voles, along with an even greater upper frequency band (30K to 40 KHz). A means for disabling speaker output and the ability to choose between a narrow or wider VCO frequency range is also provided. The highlighted (*) tone frequencies are those measured from the device using the present circuit design and switch position. The first column shows the particular switch being activated, while the corresponding action for that switch position is shown in the middle and rightmost column.

The VCO drives a signal transducer 17, which is preferably a piezoelectric speaker for generating either sonic or ultrasonic sound waves. In the sonic range, the user is able to test the operation of the device by way of an audible tone in conjunction with the operation LED indicator 14. The output of the VCO 16 is applied to the logic circuits of IC4 18. Depending on the state of the optional remote control enable/disable state, the signal is switched to the speaker driver (IC4A, IC4D) circuit 17 and the logic driver (IC4B). Connector X1-5 is the output of the logic driver for connection to an external amplifier speaker assembly, which is intended for future expansion of the device using a multi-speaker option for outdoor use in larger gardens and fields. TP1A and TP1B of the driver circuit 17 (or optionally X1-6 and X1-8) are the outputs for driving a transducer (piezoelectric speaker). This driver circuit consists of Q1, Q2, Q3, and Q4, while resistors R24, 25, 26, and 27 are not used (shorting links) and capacitors C11 and C12 are also null (not used). They are included in the design to aid with possible oscillation problems or options for driving a conventional speaker. For testing the circuit, connectors X1-9 and X1-10 are used in parallel with X1-3 to connect to the common ground on the circuit board for a test bed interface and powered ground.

As previously mentioned, if the user wishes to audibly check the circuit and operation of the device, the user may switch the device to output a signal within the human hearing range. When the momentary switch 15 (S2) is pushed, the confidence test button shifts the output frequency of the VCO circuit 16 into the human hearing range. This allows the user to hear that the circuit outgoing signal and be ensured of continued operation. As designed in the preferred embodiment of the circuit, pressing the confidence test button 15 will only output a signal when the timer signal 12 is in a high state (enabling the VCO signal to drive the speaker). So to insure the Timer signal is high (IC2-3) the user turns the power switch 20 off and then on again to reset the timer signal 12 such that the outgoing signal will remain high for about the conditioned 600 seconds. If the operational remote enable/disable control is connected, it also must be in the 'enable' state.

The remote control option provides a user with a means of activating or deactivating the device without manually engaging the device, which is particularly useful when used across larger areas and farms. A remote control means is accomplished using the disclosed circuit design by connecting a remote switch or relay between the X1-4 and X1-9 (ground). Then if you close the switch or relay it will disable the device. The remote enable/disable signal of connector 22 (X1-4) is nominally high, as pulled by R5. This enables the output of the VCO to the driver circuits, including both the speaker and the buffered VCO output at X1-5. Shorting X1-4 to ground, or low, disables the VCO output signal from reaching the driver stages. The maximum current drawn is less than 2 mA at X1-4. Switch SW1-5 is positioned in parallel with X1-4, whereby SW1-5 should normally be open (off). The ability to remotely control the assembly provides increased flexibility and a means to easily adapt future iterations of the device to one that does not require manual input at the housing location for activation/deactivation. On larger plots of land or when using multiple deterrent devices, the act of turning each device on and off can quickly become time consuming, wherein a remote control input may easily address this issue and allow stand-off control.

In a preferred embodiment, the present invention includes the aforementioned electrical elements and the disclosed circuit design. However, variations to the preferred circuit designed are contemplated, falling within the scope and spirit of the present disclosure. In an exemplary embodiment, and one shown to be effective for developing a switchable, rampable and timed signal, the following circuit elements are utilized:

TABLE 2

Circuit Design Elements and Values

| Resistors ($\Omega$) | |
|---|---|
| R1 | 56.2K |
| R2 | 261K |
| R3 | 15M |
| R4 | 3.6M |
| R5 | 10K |
| R6 | 73.2K |
| R7 | 100 |
| R8 | 1.2K |
| R9 | 10K |
| R10 | 71.5K |
| R11 | 4.53K |
| R12 | 4.87K |
| R13 | 10K |
| R14 | 6.8 |
| R15 | 6.8 |
| R16 | 6.8 |
| R17 | 6.8 |
| R18 | 6.65K |
| R19 | 4.99K |
| R20 | 4.02K |
| R21 | 3.32K |
| R22 | 100K |
| R23 | 1.2K |
| R24 | 0 |
| R25 | 0 |
| R26 | 0 |
| R27 | 0 |
| Capacitors | |
| C1 | 0.01 µf |
| C2 | 10 µf |
| C3 | 0.01 µf |
| C4 | 47 µf |
| C5 | 100 µf |
| C6 | 0.01 µf |
| C7 | 10 µf |
| C8 | 1 µf |
| C9 | 1 µf |
| C10 | 0.01 µf |
| C11 | (not used) |
| C12 | (not used) |
| Common-Emitter Amplifiers | |
| Q1 | 2N3904 |
| Q2 | 2N3904 |
| Q3 | 2N3906 |
| Q4 | 2N3906 |
| Q5 | 2N3904 |
| Speaker | |
| SP1 | 200 Watt Peak, Piezo Speaker |
| Integrated Circuits | |
| IC1 | NE555 Ramp Generator |
| IC2 | NE555 Timer On/Off Generator |
| IC3 | XR-2209 VCO |
| IC4 | 4001N Logic Circuit |

TABLE 2-continued

Circuit Design Elements and Values

| | Connectors |
|---|---|
| X1 | 10 Pin I/O Connector |

| | Switches |
|---|---|
| S1 | SPDT Toggle Switch |
| S2 | NC Push-Button Switch |
| SW1 | SPST-7 Position Slide Switch |

| | Diodes |
|---|---|
| D1 | 1N4004 |
| D2 | 1N4004 |
| LED1 | LED, Green |

Figure 4:
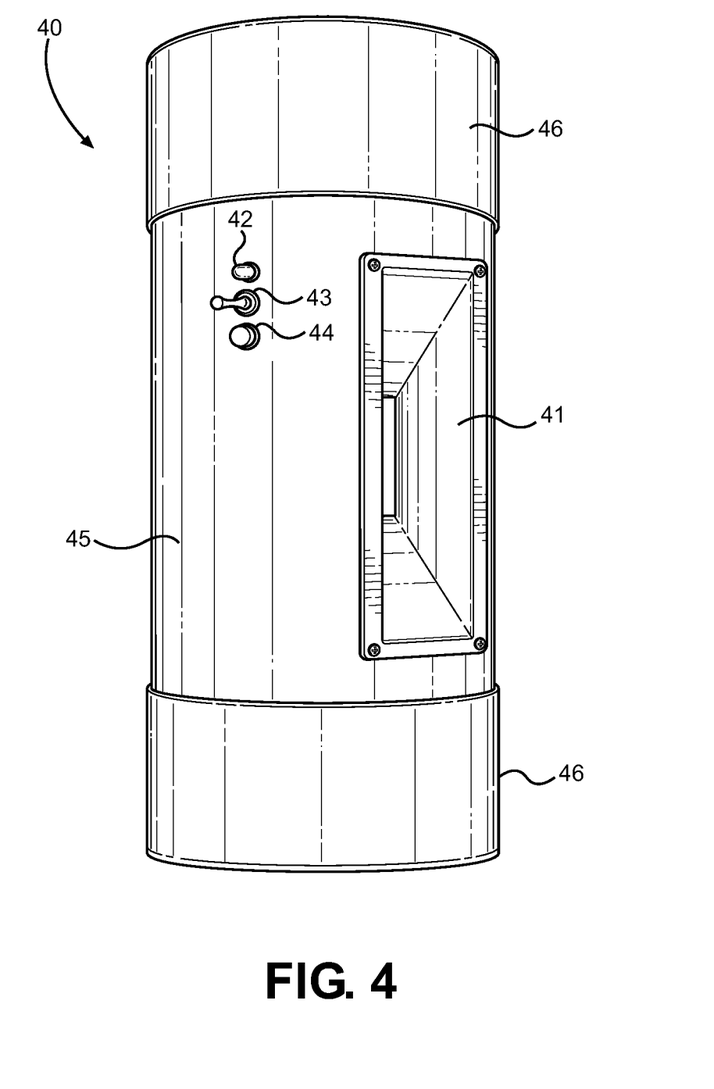
FIG. 4 shows an embodiment of the housing of the present deterrent device.
Figure 5:
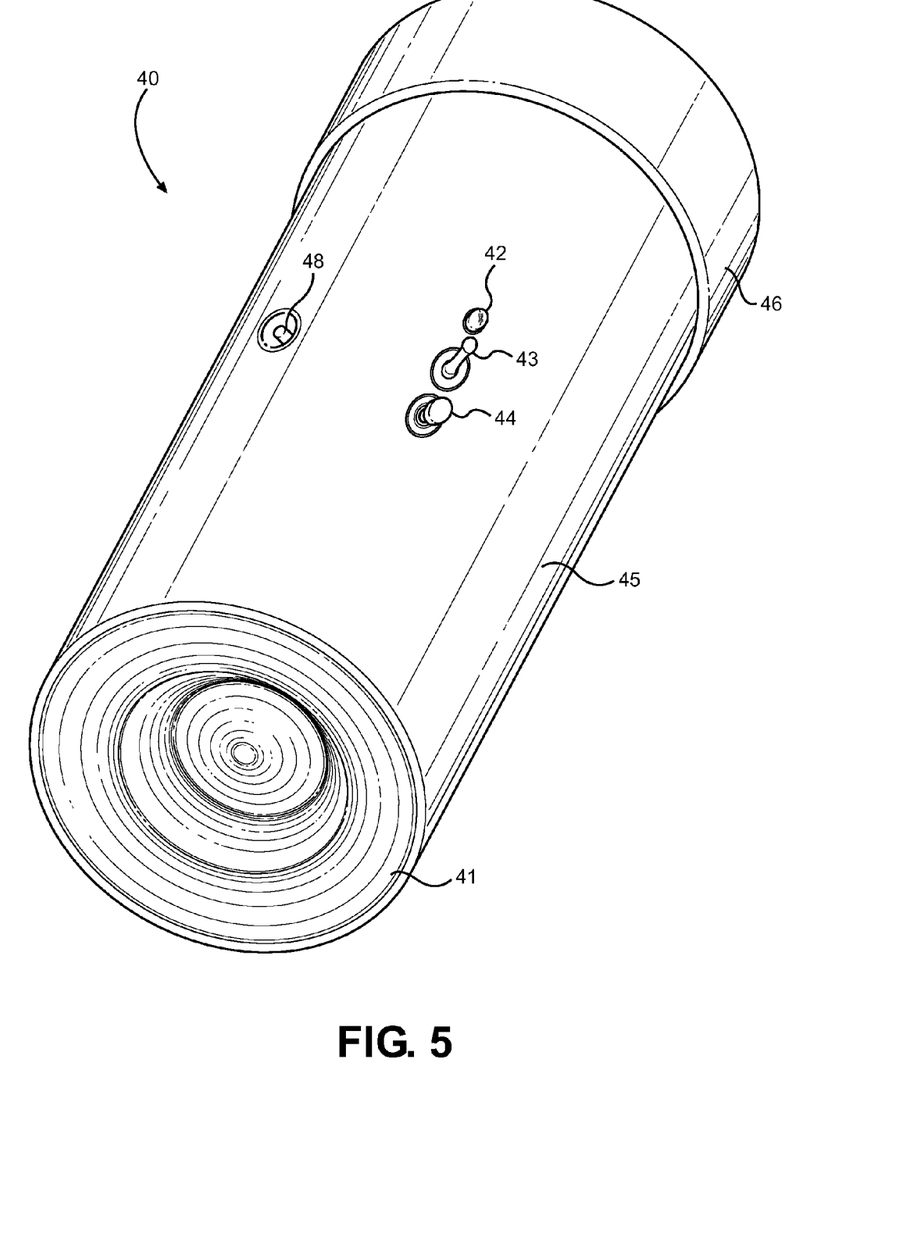
FIG. 5 shows another embodiment of the housing of the present deterrent device.

Referring now to FIGS. 4 and 5, there are shown two embodiments of the device housing 40, wherein a cylindrical body 45 is shown having a first and second end 46. The outgoing signal is projected from a speaker 41 along the side or end of the housing, while the operational light LED 42, ON/OFF switch 43 and confidence test button 44 are positioned along the housing 45. Further provided may be an electrical power connector 48 for accepting power. The housing is one that shrouds the electrical components from moisture and rain, while providing a means to attached the device to an upstanding post or wall and accept power. The user operates a remote control or operates the switch 43 for operation and deactivation of the device, while the timer modulates the signal operation and the chosen switch 13 position changes the tone frequency and ramp range.

Overall, the preferred embodiment of the present invention includes the following: a 9 to 14 VDC single power supply, a means of preventing supply voltage reversal, an LED power indicator, an on/off switch and optional remote enable/disable, a confidence test means, a power saving timer cycle, a frequency ramp range, tone, and manual switching thereof, along with a water resistant housing that protects and supports the imbedded printed circuit board (PCB) that controls operation. The preferred signal transducer is further a piezoelectric speaker, along with outputs for external amplification and larger speaker assemblies.

The present device utilizes sound technology to rid greenhouses and gardens of unwanted pests. The device emits a sweeping high frequency sound wave, switchable above the human hearing range, which makes it difficult for grasshoppers, voles and other pests to remain in the area. The invention comprises four primary components: a housing unit, a circuit card/PCB assembly, a speaker and a power supply module. The circuit board includes a low frequency generator that drives a simple RC filter to create a crude ramp signal. This ramp signal drives a VCO, which creates the sweep frequencies that apply to the driver section that is then capable of driving a speaker transducer. The circuit board may include a low frequency generator that enables and disables the output of the speaker for power savings and further pest annoyance, while a confidence switch momentarily shifts the frequency of the device within human hearing range for testing and verification purposes. All the components of the circuit are placed within the housing unit to prevent exposure to water and humidity, which is critical for an electrical component utilized outdoors or in high humidity environments. The exterior of the unit includes an on/off activation switch, a confidence switch and a power indicator light that comprise the user interface, while an optional remote control allows remote activation and switching of the assembly. A mounting clip or bracket on the housing permits mounting to a support within the desired location requiring pest deterrence, while power is delivered via a battery power source, solar power or preferably a VAC power source. In the preferred embodiment, the invention consumes less than three watts of energy and is continually activated/deactivated using the timer generator. The sound wave cycles off every ten minutes and then restarts after a two minute period.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ultrasonic pest deterrent device, comprising:
a housing having a signal transducer and a circuit for driving said transducer;
said circuit comprising a power supply input and on/off switch, a means of preventing supply voltage reversal, a signal ramp generator, a voltage control oscillator, a timer generator and a user switch;
said switch for controlling tone and selecting a band of signal frequency being swept, wherein said signal is emitted from said transducer;
said signal switchable between ultrasonic and sonic frequencies;
a confidence test button for emitting a sonic frequency within human hearing range.

2. The device of claim 1, wherein said circuit further comprises an operational Light Emitting Diode (LED) to visually verify signal generation.

3. The device of claim 1, wherein said circuit further comprises wiring input for a remote control.

4. The device of claim 1, wherein said circuit further comprises wiring output for external amplification of said signal.

5. The device of claim 1, wherein said circuit further comprises a means of generating a switch tone between 1.4 kHz and 35 kHz.

6. The device of claim 1, wherein said circuit further comprises a means of sweeping between a broad and narrow range of frequencies.

7. The device of claim 1, wherein said signal ramp generator is a square wave oscillator connected to an RC filter to create a triangular wave output signal to ramp said signal frequency with a defined band controlled by said switch position.

8. The device of claim 1, wherein said timer generator switches said signal on for approximately 600 seconds and then disables it for approximately 120 seconds before repeating.

9. The device of claim 1, wherein said housing is waterproof to shroud said circuit from moisture.

10. The device of claim 1, wherein said signal transducer is a piezoelectric speaker.

11. The device of claim 1, wherein said power supply is a wall module power supply.

12. The device of claim 1, wherein said power supply is derived from at least one battery for independent operation.

13. The device of claim 1, wherein said power supply is a solar power input in conjunction with at least one battery.

14. The device of claim 1, wherein said power supply is a wall module power supply in conjunction with a solar power input with at least one battery, wherein said solar power supplies power whenever its voltage is greater than said wall module.

15. The device of claim 1, wherein said switch includes switches to control signal tone frequency, ramp range between a plurality of switchable frequency bands, wide or narrow sweeping with said bands and overall device operation.

* * * * *